(No Model.)

H. T. LEWIS.
HUB ATTACHING DEVICE.

No. 544,181. Patented Aug. 6, 1895.

WITNESSES:
John A. Rennie
Theo. G. Hoster

INVENTOR
H. T. Lewis
BY Munn & Co
ATTORNEYS.

United States Patent Office.

HARTWELL T. LEWIS, OF CALUMET, MICHIGAN.

HUB-ATTACHING DEVICE.

SPECIFICATION forming part of Letters Patent No. 544,181, dated August 6, 1895.

Application filed January 7, 1895. Serial No. 534,077. (No model.)

*To all whom it may concern:*

Be it known that I, HARTWELL T. LEWIS, of Calumet, in the county of Houghton and State of Michigan, have invented a new and Improved Device for Holding Wheels to Axles, of which the following is a full, clear, and exact description.

The invention relates to wheeled vehicles, and its object is to provide a new and improved device for holding a wheel to the axle in a very simple manner and to prevent dust and other impurities from passing to the spindle.

The invention consists principally of a nut mounted to turn loosely on the axle-spindle and screwing in the wheel-hub to hold the latter on the axle-spindle, and means for locking the said nut in place to unscrew the hub from the nut.

The invention also consists in certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1:
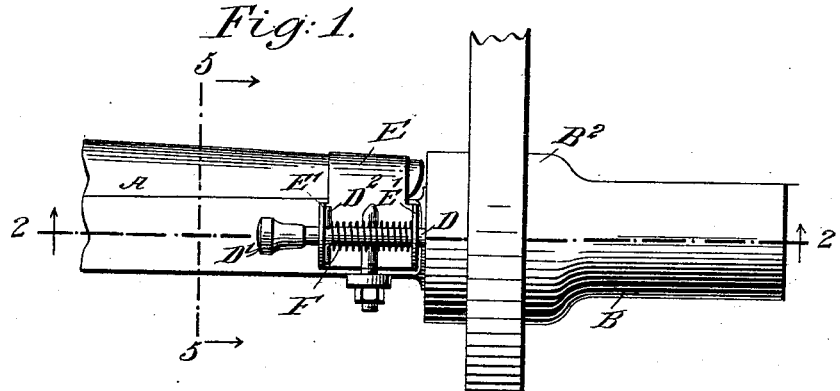
Figure 2:
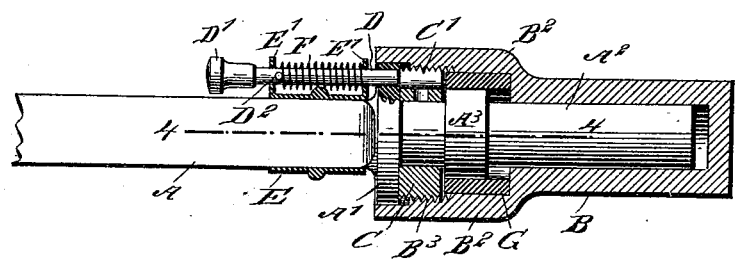
Figure 3:
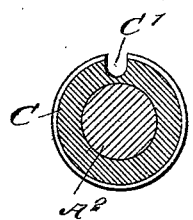
Figure 4:
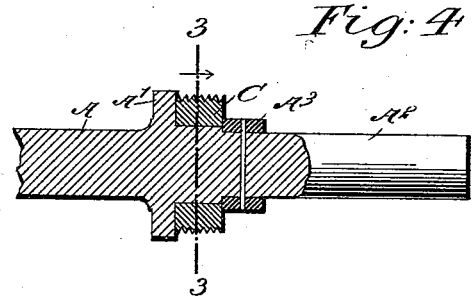
Figure 5:
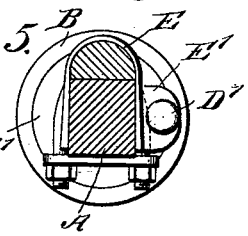

Figure 1 is a side elevation of the improvement. Fig. 2 is a sectional plan view of the same on the line 2 2 of Fig. 1. Fig. 3 is a transverse section of the spindle and the nut on the line 3 3 of Fig. 4. Fig. 4 is a sectional side elevation of the same on the line 4 4 of Fig. 2, and Fig. 5 is a transverse section of the same on the line 5 5 of Fig. 1.

The axle A is provided near each end with the usual collar A', from which extends the spindle $A^2$, fitting into the hub B of the wheel B'. The hub B is provided at its inner end with the enlarged portion $B^2$, formed with an internal screw-thread $B^3$, in which screws a nut C, mounted to turn loosely on the inner end of the spindle $A^2$ between the flange A' and a second smaller flange $A^3$, fastened on the spindle $A^2$. This nut C is formed with a longitudinal recess C', adapted to be engaged by the inner end of a pin D, mounted to slide in suitable bearings E', formed on the clip E, connecting the usual wooden portion of the axle with the metallic part thereof, as indicated in Figs. 1 and 2. The inner end of the pin D is guided in an opening formed in the flange A', the opening registering with the recess C' in the nut C.

The outer end of the pin D is provided with a knob D', adapted to be taken hold of by the operator to press the pin D inwardly, so as to engage the inner end of the pin with the recess C' to hold the nut C in position—that is, to prevent it from turning on the spindle $A^2$, so as to permit of unscrewing the hub B from the nut whenever it is desired to remove the wheel B'.

The pin D is normally held in an outermost position by the action of a spring F, coiled on the pin D between the bearings E', one end of the pin resting against one of the bearings and the other against a projection or pin $D^2$, held on the locking-pin D.

A bushing G is fitted in the enlarged end $B^2$ of the hub B, next to the thread $B^3$, to engage the exterior peripheral surface of the flange $A^3$ and jams against the outer end of loose nut C. The outer end of the hub $B^2$ is closed and upon the inner end fits the flange A', so that dust and other impurities are not liable to pass to the spindle $A^2$, and consequently the bearing and contacting parts are not cut up by the dust, as is frequently the case in vehicles as now constructed.

Now, when the several parts are in the position illustrated in Figs. 1 and 2, then the end of the pin D is out of engagement with the nut C, so that the latter revolves freely around the spindle $A^2$ as the wheel rotates on rolling off on the ground. As the nut C is held between the two flanges A' and $A^3$, the nut cannot slip off the spindle $A^2$, and consequently the wheel A is held in position on the spindle on account of engaging the said nut C by its threaded portion $B^3$.

When it is desired to remove the wheel B' from the spindle $A^2$ for lubricating or other purposes, then the operator presses the knob D' inward and turns the wheel B' until the recess C' of the nut C is in alignment with the pin D, to permit the latter to pass into the recess to lock the nut C in position. On the further revolving of the wheel B' in a reverse direction the threaded portion $B^3$ unscrews from the nut C, now held stationary, so that the hub B is unlocked from the nut and the wheel can be readily slipped off the spindle. When repairs have been made the wheel is again slipped on the spindle and turned in a forward direction, so as to screw its threaded portion B³ onto the nut C, still held stationary by being engaged by the pin D. When the threaded portion B³ has been fully screwed up on the nut C, then the operator releases the pressure on the knob D', so that the pin D moves out of engagement with the nut C, and the latter now again freely turns with the hub B loosely on the spindle A².

It will be seen that the spring F tends to hold the pin D normally out of engagement with the aperture in the nut C, and the movement of said pin is such that the aperture in flange A' is closed by it at all times.

It will be seen that this device is very simple and durable in construction, and the pin D being held at all times in the aperture in flange A' prevents dust from getting to the spindle, at the same time permitting the lubricant to properly lubricate the spindle and hub without danger of the lubricant running to the outside.

It will further be seen that no extra tools, such as wrenches, are required to remove the wheel from the spindle whenever it is desired to lubricate or to repair, as the case may be.

The steel bushing G is adapted to take up the wear of the inner face of the nut C, so that the flange A³ is not affected by the constant revolving of the nut C.

Having thus described my invention, I claim as new and desire to secure by Letters Patent—

1. A device of the class described, comprising an axle formed with two flanges on its spindle, a nut mounted to turn loosely on the spindle between the flanges, a wheel hub closed at its outer end and formed in its bore near the inner end of the hub with a thread engaging the said nut, and a bushing arranged within the hub and fitted over the outermost flange of the spindle to form a bearing edge for one face of the nut, substantially as shown and described.

2. A device of the character described comprising an axle having two flanges on its spindle, one of said flanges being provided with a perforation extending through it, a wheel hub having a bore adapted to fit the flanges on the axle and provided with a screw-threaded portion, a nut engaging the screw threads in the wheel hub and held between the flanges on the axle, said nut being provided with a perforation corresponding with the perforation in the flange of the axle, a longitudinally movable locking pin carried by the axle with its ends closely fitting the perforation in the axle flange, and adapted to close the same and adapted when moved longitudinally to engage and enter the perforation in the nut of the wheel hub, and a spring connected to the said pin and adapted to hold the same normally in the perforation in the axle flange and out of the perforation in the nut on the wheel hub, substantially as set forth.

HARTWELL T. LEWIS.

Witnesses:
JAMES JAMES,
E. S. STRINGER.